(12) United States Patent
Wilson

(10) Patent No.: US 12,395,770 B2
(45) Date of Patent: Aug. 19, 2025

(54) DUAL AXIS ADJUSTABLE SPEAKER MOUNT

(71) Applicant: ROSWELL CANADA INC., Acheson (CA)

(72) Inventor: Darrick J. Wilson, Edmonton (CA)

(73) Assignee: ROSWELL CANADA INC. (CA)

( * ) Notice: Subject to any disclaimer, the term of this patent is extended or adjusted under 35 U.S.C. 154(b) by 237 days.

(21) Appl. No.: 18/197,881

(22) Filed: May 16, 2023

(65) Prior Publication Data

US 2023/0370756 A1 Nov. 16, 2023

Related U.S. Application Data

(60) Provisional application No. 63/342,327, filed on May 16, 2022.

(51) Int. Cl.
*H04R 1/02* (2006.01)
*B60R 11/02* (2006.01)
*B63B 17/00* (2006.01)

(52) U.S. Cl.
CPC .......... *H04R 1/026* (2013.01); *B60R 11/0217* (2013.01); *B63B 17/00* (2013.01); *H04R 2201/025* (2013.01); *H04R 2499/13* (2013.01)

(58) Field of Classification Search
CPC .............. H04R 1/026; H04R 2201/025; H04R 2499/13; B60R 11/0217; B63B 17/00
See application file for complete search history.

(56) References Cited

U.S. PATENT DOCUMENTS

| 3,023,990 | A  | 3/1962  | Gunthel       |
|-----------|----|---------|---------------|
| 5,201,896 | A  | 4/1993  | Kruszewski    |
| D467,535  | S  | 12/2002 | Ishida et al. |
| 6,719,255 | B2 | 4/2004  | Chen          |
| 6,798,892 | B2 | 9/2004  | Parnell       |
| 7,150,578 | B2 | 12/2006 | Porco         |
| 7,350,755 | B1 | 4/2008  | Harrison      |

(Continued)

FOREIGN PATENT DOCUMENTS

| CN | 212909922 U | * | 7/2014 |
| WO | 2020123498 A1 | | 6/2020 |

OTHER PUBLICATIONS

Translation of Cn212909922 U (Year: 2021).*

*Primary Examiner* — Andrew Sniezek
(74) *Attorney, Agent, or Firm* — Timothy H. Van Dyke; Wolter Van Dyke; Davis, Pllc

(57) ABSTRACT

An apparatus (100), including: an upper connection assembly (120) having an adapter (402) configured to be secured to a boat tower, an upper rotor body (400), and an upper joint assembly (404) therebetween that is configured to permit rotation of the upper rotor body about a first axis (106); a first lateral connection assembly (900) having a first outer side rotation body (902), a first inner side rotation body (904) configured to be secured to a speaker housing, and a first lateral joint assembly (908) therebetween that is configured to permit rotation of the first inner side rotation body about a second axis (108); and a frame (122) that secures the first lateral connection assembly to the upper connection assembly and that is configured to orbit the first lateral connection assembly around the first axis when the upper rotor body is rotated about the first axis.

23 Claims, 13 Drawing Sheets

(56) References Cited

U.S. PATENT DOCUMENTS

| | | |
|---|---|---|
| 8,229,155 B2 | 7/2012 | Maurer et al. |
| 8,313,069 B2 | 11/2012 | Yim et al. |
| 8,568,162 B1 | 10/2013 | White et al. |
| 8,582,798 B2 | 11/2013 | Staley et al. |
| 9,180,943 B2 | 11/2015 | Oswell et al. |
| 9,393,898 B2 | 7/2016 | Hasbrook et al. |
| 9,516,396 B2 | 12/2016 | Andrews et al. |
| 9,942,639 B2 | 4/2018 | Wright |
| D847,113 S | 4/2019 | Nicolas et al. |
| 11,044,541 B1 | 6/2021 | Ambrose et al. |
| 2001/0023915 A1 | 9/2001 | Hailson |
| 2003/0142422 A1 | 7/2003 | Spitzer et al. |
| 2003/0174855 A1 | 9/2003 | Hawkins et al. |
| 2004/0202346 A1 | 10/2004 | Park et al. |
| 2005/0100187 A1 | 5/2005 | Yang |
| 2005/0236540 A1 | 10/2005 | Bennett |
| 2006/0249647 A1 | 11/2006 | Whitehouse et al. |
| 2007/0075202 A1 | 4/2007 | Gordon |
| 2007/0295874 A1 | 12/2007 | Hollenhead et al. |
| 2008/0049958 A1 | 2/2008 | Bingaman |
| 2013/0202147 A1 | 8/2013 | Staley et al. |
| 2014/0197218 A1* | 7/2014 | Jordan .................. B60Q 1/18 224/545 |
| 2017/0289662 A1 | 10/2017 | Hannath et al. |
| 2019/0113072 A1 | 4/2019 | Chijoff et al. |

* cited by examiner

DUAL AXIS ADJUSTABLE SPEAKER MOUNT

CROSS REFERENCE TO RELATED APPLICATIONS

This application claims the benefit of U.S. provisional patent application Ser. No. 63/342,327 titled "Dual Axis Adjustable Speaker Mount", filed on May 16, 2022, the entire disclosure of which is incorporated herein by reference.

FIELD OF THE INVENTION

The invention relates to a speaker mount configured to provide selective positioning of a speaker housing about two perpendicular rotation axes.

BACKGROUND OF THE INVENTION

Mounting arrangements that secure speakers to boat towers are known to permit selectively adjustable positioning about a single, typically vertical, axis. This allows one to selectively aim the speaker at various locations lateral to the speaker. However, instances exist where greater flexibility would be advantageous. Consequently, there is room in the art for improvement.

BRIEF DESCRIPTION OF THE DRAWINGS

The invention is explained in the following description in view of the drawings that show.

DETAILED DESCRIPTION OF THE INVENTION

The present inventor has devised a unique and innovative dual axis adjustable speaker mount that permits adjustment of a speaker housing around a first axis as well as around a second axis that is perpendicular to the first axis. When mounted to, for example, an overhead tower of a marine vessel, the dual axis adjustable speaker mount enables a user to select targets that are lateral to the speaker as well as at various locations below the speaker.

Figure 1:
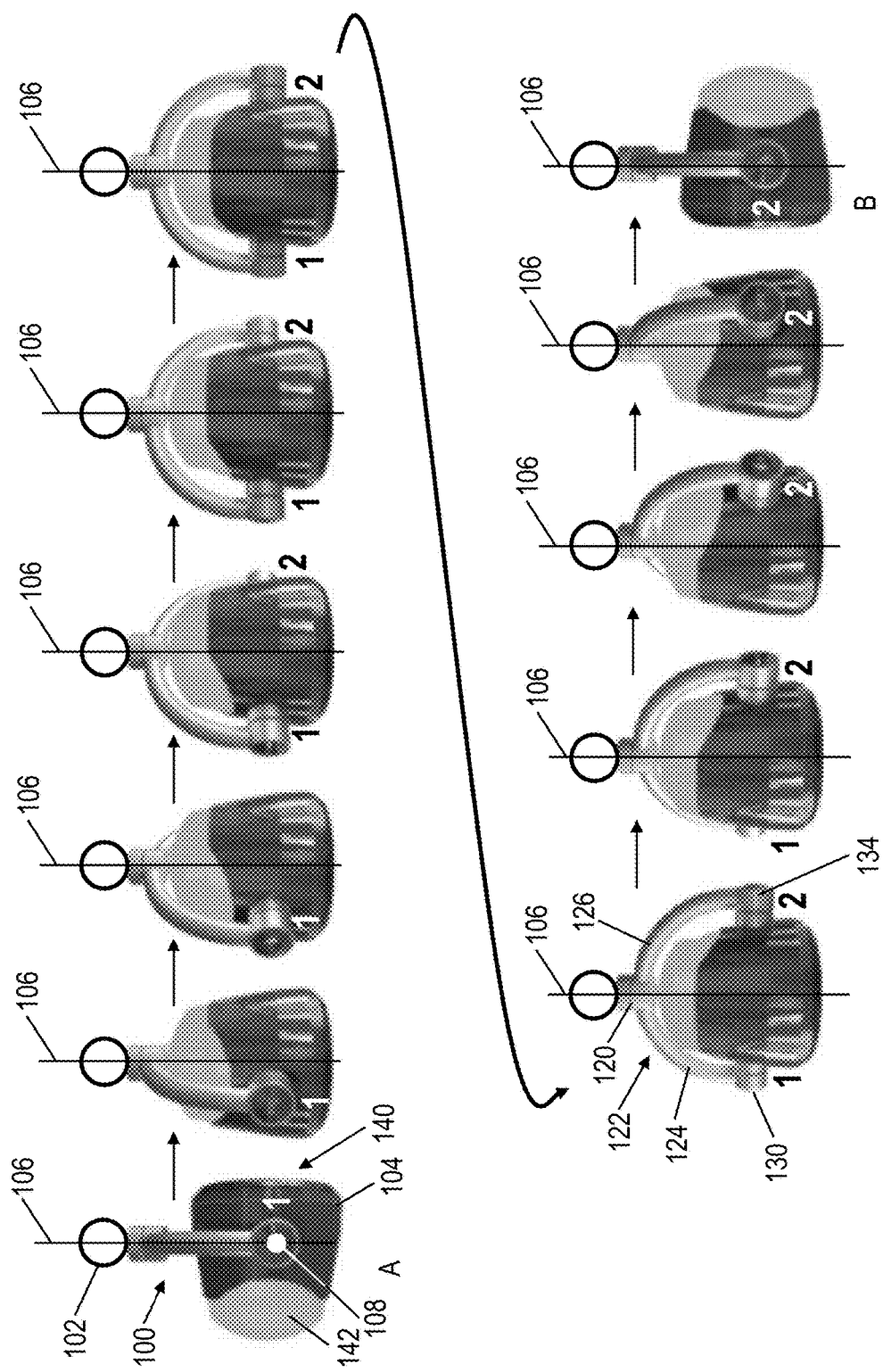
FIG. 1 shows an example embodiment of a dual axis adjustable speaker mount in a variety of angular positions about a first rotational axis.

FIG. 1 shows an example embodiment of a dual axis adjustable speaker mount 100 secured to, for example, a tower 102 of a marine vessel. The dual axis adjustable speaker mount 100 is secured to a speaker housing 104 and is configured to permit rotation of the speaker housing 104 through a variety of angular positions about a first rotational axis 106. The dual axis adjustable speaker mount 100 includes an upper connection assembly 120 secured to the tower 102. A frame 122 having a first lateral arm 124 and a second lateral arm 126 is secured to the upper connection assembly 120. The upper connection assembly 120 is configured to rotate the frame 122 about the first axis 106.

A first lateral connection assembly 130 is secured to a distal end of the first lateral arm 124 and is configured to be secured to a first side "1" of a speaker housing 132. A second lateral connection assembly 134 is secured to a distal end of the second lateral arm 126 and is configured to be secured to second side "2" of the speaker housing 132. In an example embodiment, the second side "2" is opposite the first side "1". In an example embodiment, the first lateral arm 124 is configured to orbit the first lateral connection assembly 130 about the first axis 106 and the second lateral arm 126 is configured orbit the second lateral connection assembly 134 about the first axis 106 when the frame 122 rotates about the first axis 106.

Figure 2:
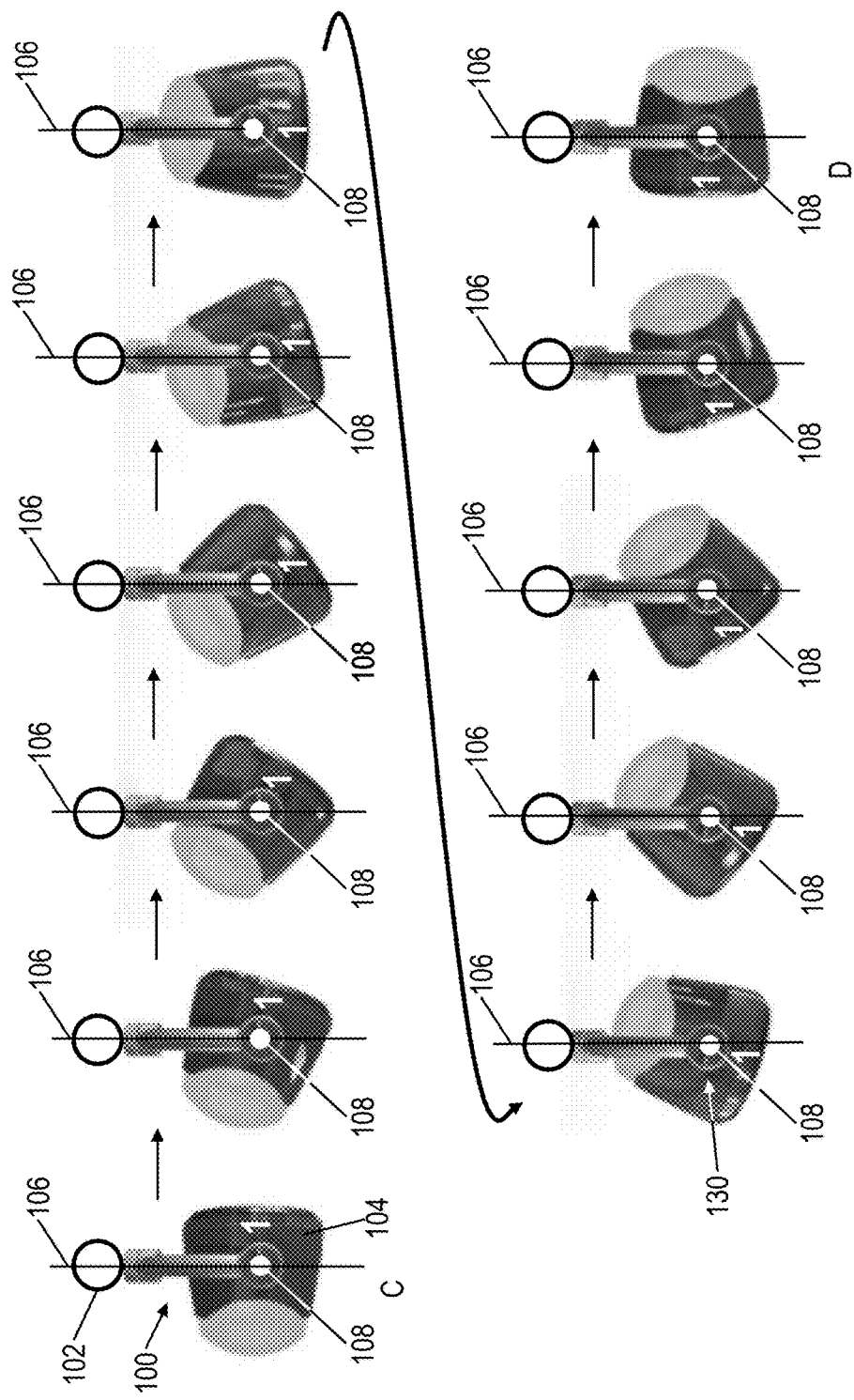
FIG. 2 shows the dual axis adjustable speaker mount of FIG. 1 in a variety of angular positions about a second rotational axis.

FIG. 2 shows the dual axis adjustable speaker mount 100 secured to the tower 102 and in a variety of angular positions about a second rotational axis 108 (in and out of the page in FIG. 2). Rotation about the second axis 108 is made possible by the first lateral connection assembly 130 and the second lateral connection assembly 134, which each permit the speaker housing 104 to rotate about the second axis 108.

As shown in FIG. 1, in position A, the speaker 140 points to the right (and a translucent light cover 142 points to the left). After rotating the frame 122 about the first axis 106 by 180 degrees as shown, the speaker 140 reaches position B and the speaker 140 points to the left. If the speaker housing 104 remains horizontal during this 180-degree rotation, then the speaker 140 sweeps 180 horizontal degrees out of the page from right to left. If the speaker 140 in position A is rotated about the second axis 108 to point to the left, and then the frame is rotated about the first axis 106 by 180 degrees, the speaker again reaches position B, but would be pointing to the right. In this case, the speaker 140 would sweep 180 horizontal degrees into the page from left to right. In this manner, the speaker 140 can sweep 360 horizontal degrees.

As shown in FIG. 2, in position C (the three o'clock position), the speaker 140 points to the right. After rotating the speaker housing 104 about the second axis 108 by 180 degrees as shown, the speaker housing 104 reaches position D (the nine o'clock position) and the speaker 140 points to the left. The speaker 140 thereby moves through a 180-degree downward oriented sweep. Since the speaker 140 can be pointed in any 360-lateral direction by virtue of the frame's rotation about the first axis 106, and since in every lateral position the speaker housing 104 can be rotated from horizontal (e.g., a three o'clock position), to downward pointing (e.g., a six o'clock position), to horizontal (e.g., a nine o'clock position) by virtue of the speaker housing's rotation about the second axis 108, the speaker 140 can be pointed in a hemisphere that is anywhere horizontal and below.

Figure 3:
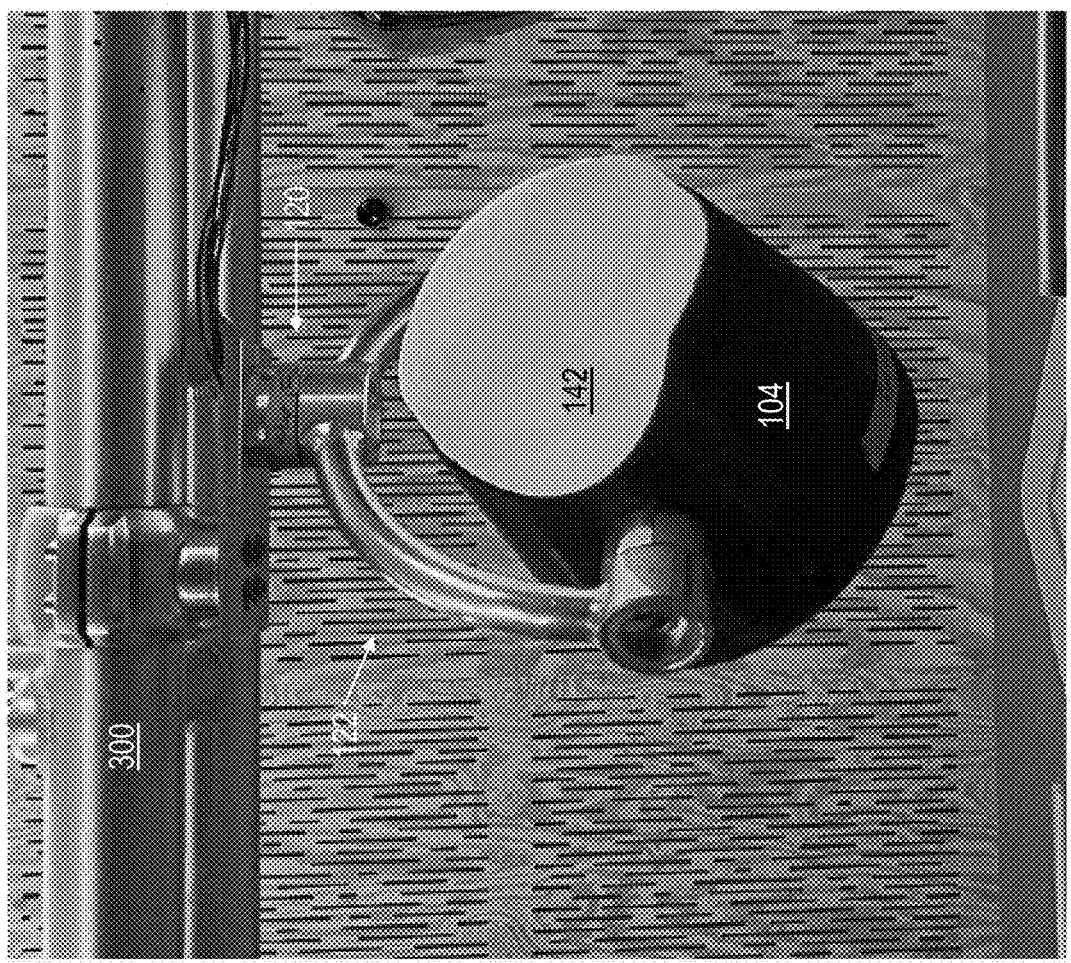
FIG. 3 shows the dual axis adjustable speaker mount of FIG. 1 secured to a tower.

FIG. 3 shows the dual axis adjustable speaker mount 100 secured to a tower 300.

Figure 4:
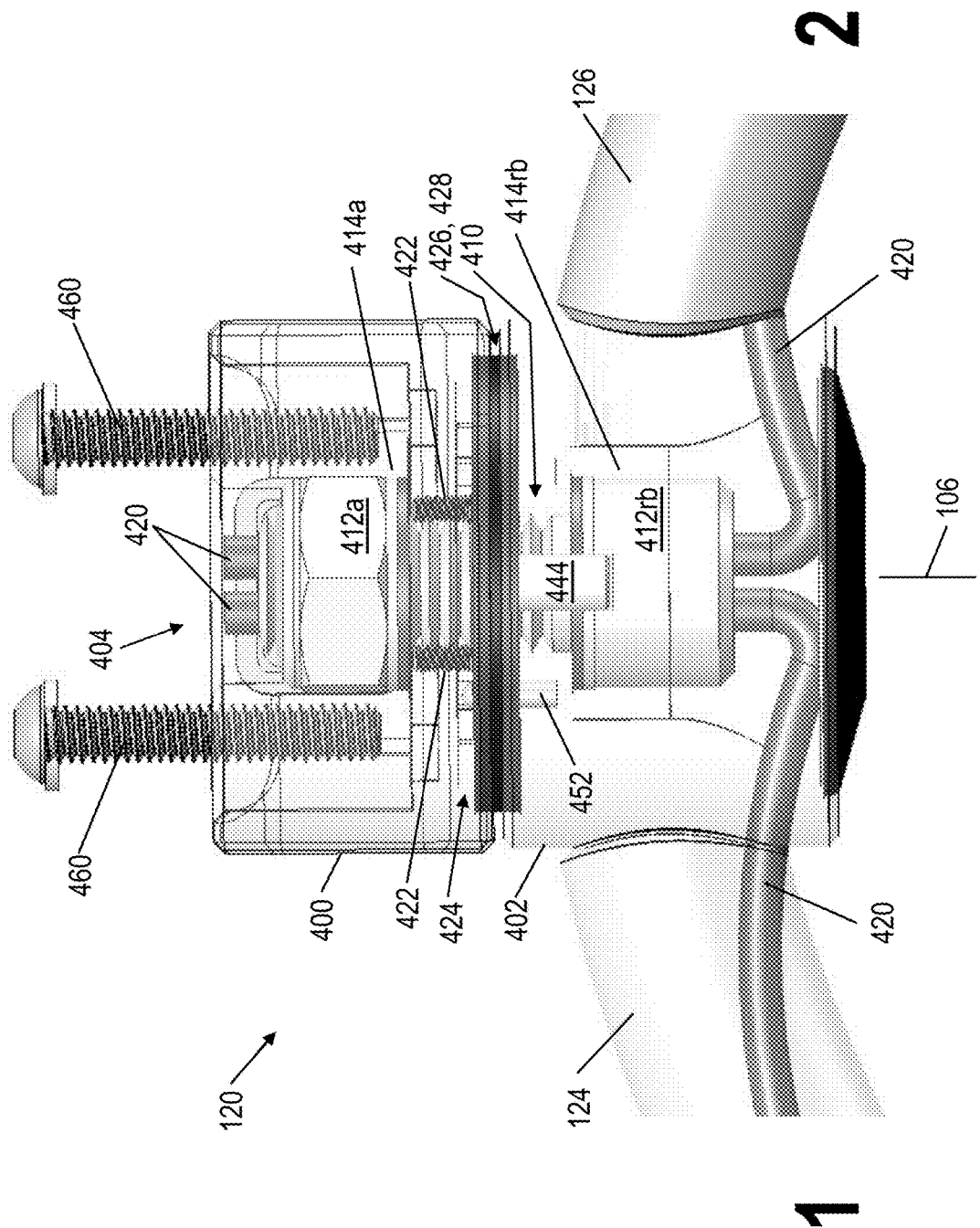
FIG. 4 to FIG. 8 show an example embodiment of an upper connect assembly of the dual axis adjustable speaker mount of FIG. 1.
Figure 5:
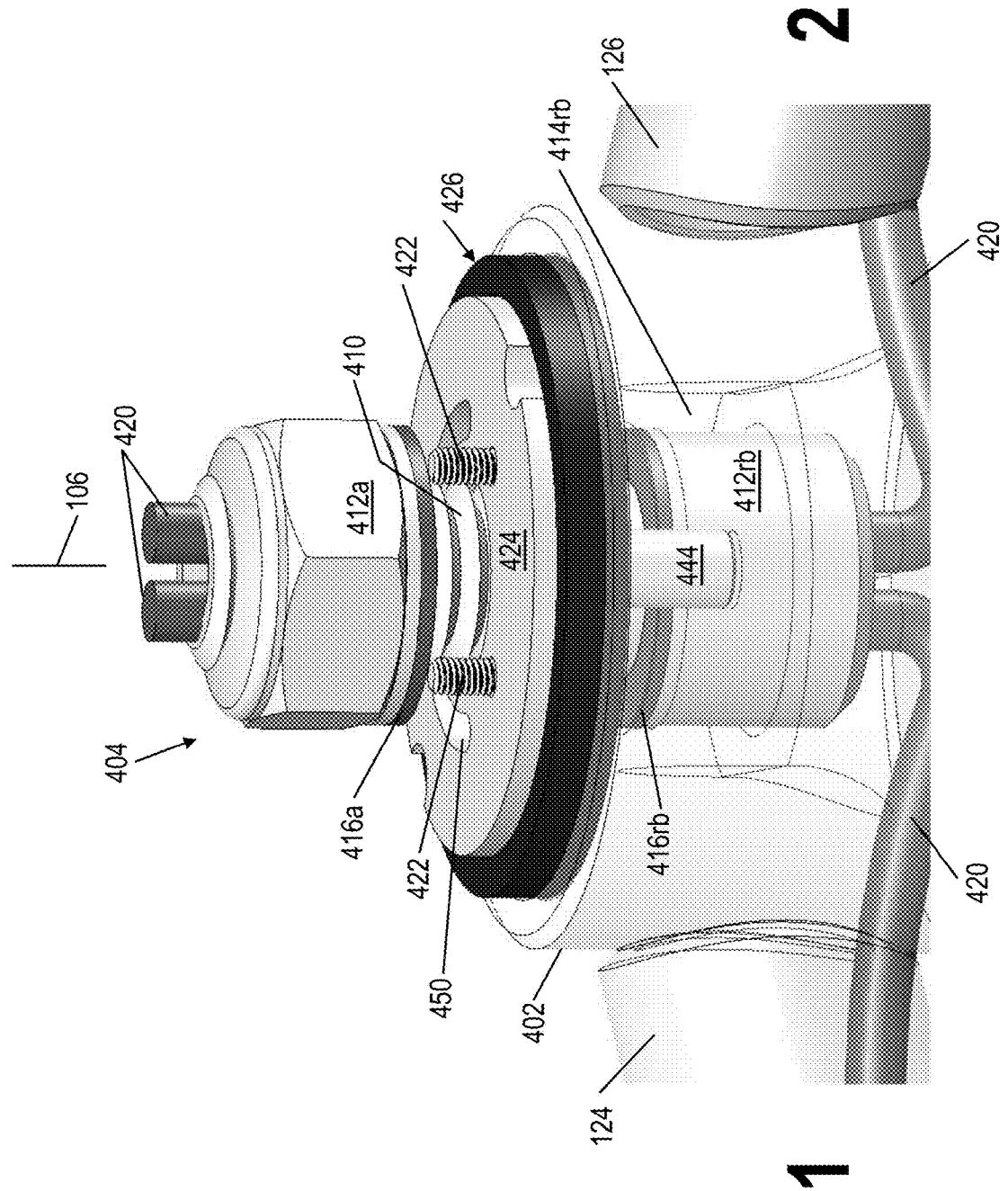
Figure 6:
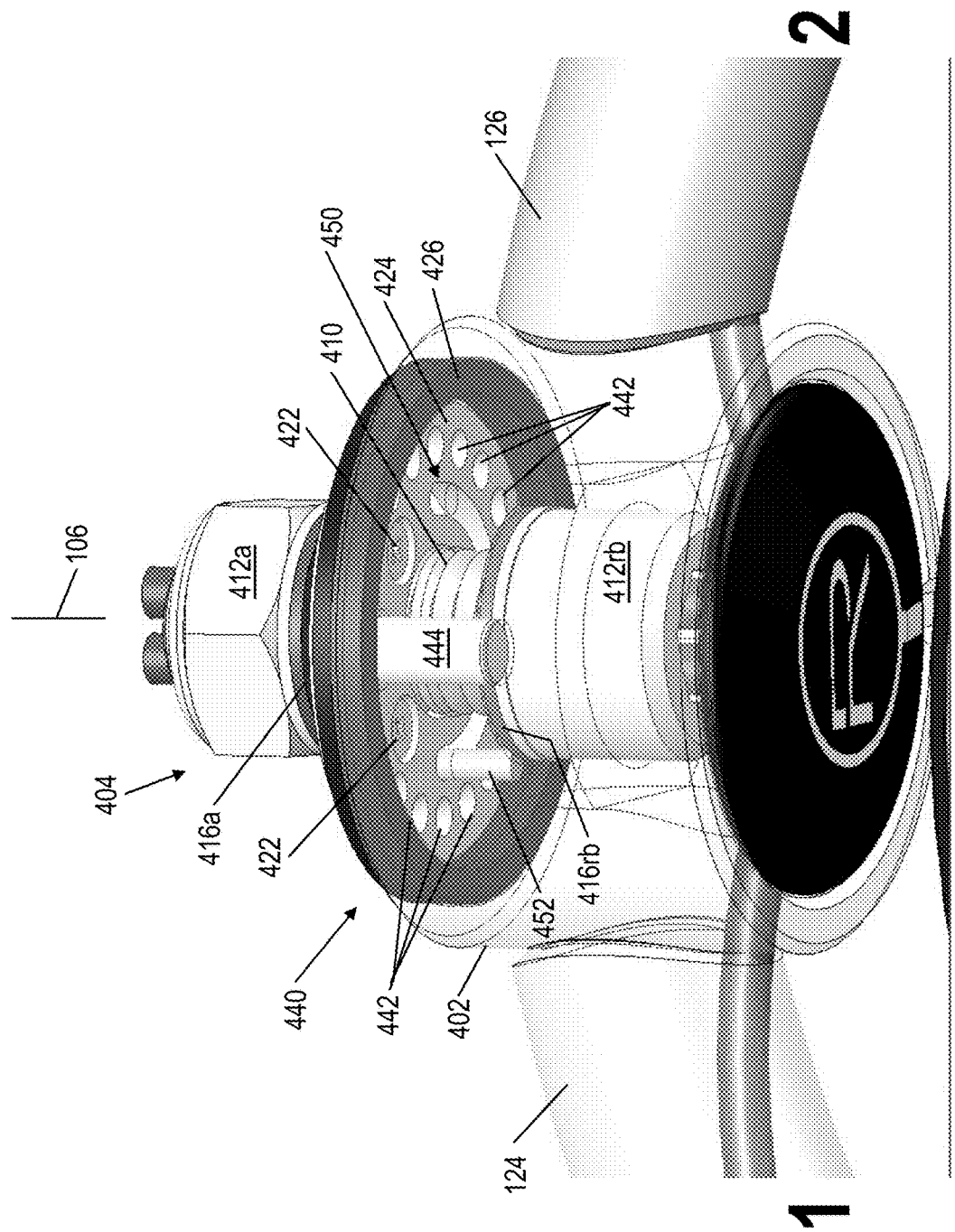
Figure 7:
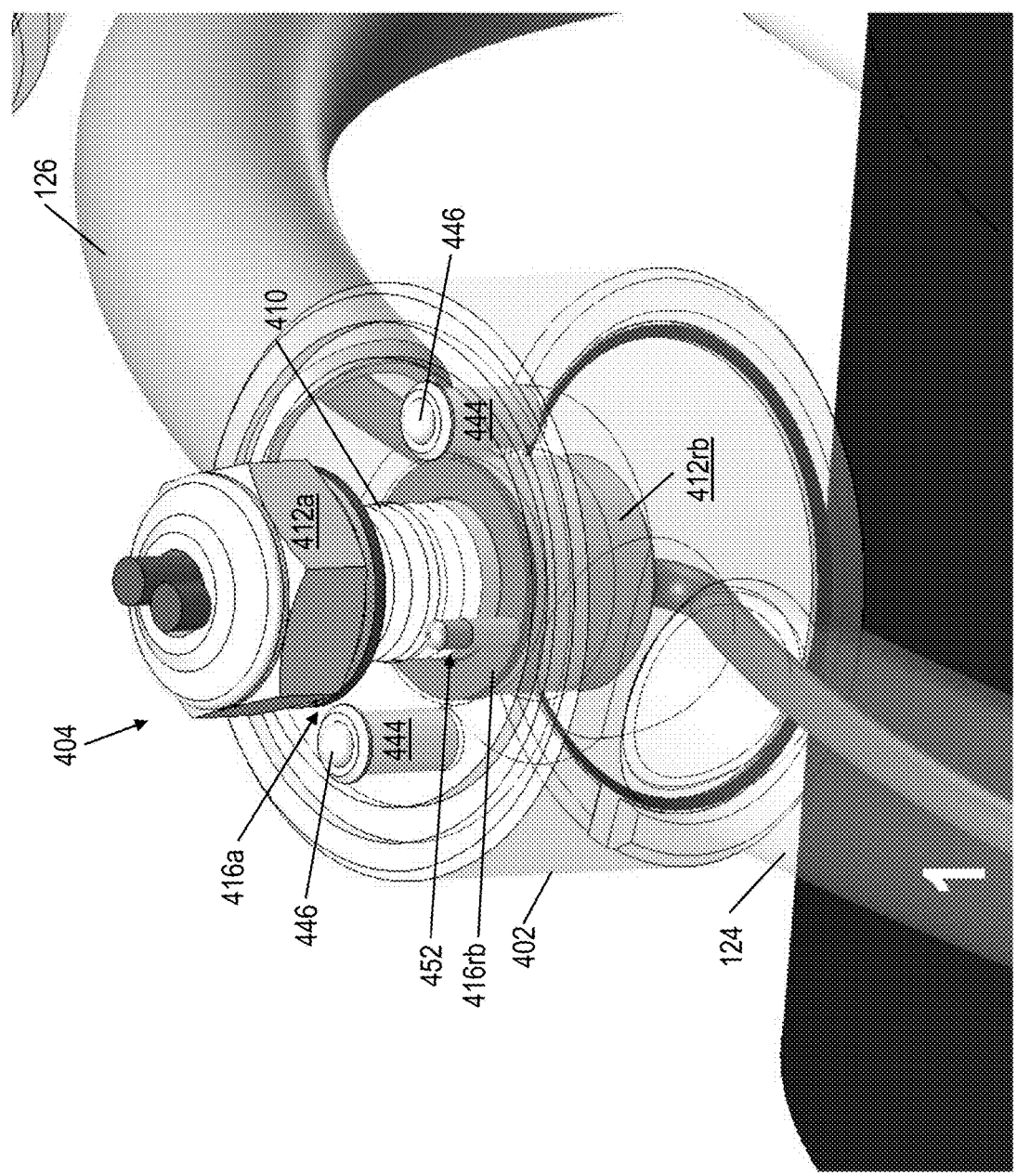

FIG. 4 to FIG. 8 show an example embodiment of the upper connection assembly 120 and its components. FIG. 4 shows all components of the upper connection assembly 120. In FIG. 5 to FIG. 8, various components have been removed for clarity.

In an example embodiment, the upper connection assembly 120 includes an adapter 400 configured to be secured to the boat tower 102, an upper rotor body 402, and an upper joint assembly 404 therebetween that is configured to permit rotation of the upper rotor body 402 about the first axis 106. In an example embodiment, an upper threaded spindle 410, an upper nut 412a, and an upper cap 412rb (in respective upper recesses 414a, 414rb) are concentric with the first axis 106 and secure the adapter 400 to the upper rotor body 402. Optional upper friction washers 416a, 416rb are disposed between the upper nut 412a and the adapter 400, and the upper cap 412rb and the upper rotor body 402 respectively.

In an example embodiment, the upper threaded spindle 410 may have a hollow, cylindrical shape that acts as a conduit to allow wires 420 (e.g., speaker wires, light signal wire, light power wire etc.) to pass through the upper connection assembly 120. In an example embodiment, at least one of the first lateral arm 124 and the second lateral arm 126 is also hollow and configured to act as a conduit through which the wires 420 pass.

In an example embodiment, upper plate locating plate screws 422 secure an upper locating plate 424 to the adapter 400. The upper locating plate 424 may be concentric with the upper threaded spindle 410 and may be surrounded by an upper washer 426 (e.g., rubber) concentric with the upper locating plate 424 that forms an upper seal 428 between the upper rotor body 402 and the adapter 400. The upper locating plate 424 and optional upper washer 426 center the upper rotor body 402 relative to the adapter 400 about the first axis 106.

In an example embodiment, an upper detent assembly 440 is configured to selectively secure the upper rotor body 402 in a plurality of upper clocking positions about the first axis 106. In an example embodiment, the upper detent assembly 440 includes a plurality of upper detent holes 442 disposed on an underside of the upper locating plate 424 in an annular array about the first axis 106. The upper detent assembly 440 further includes at least one upper plunger assembly 444 disposed in the upper rotor body 402 and configured to selectively align with a respective upper detent hole 442 as the upper rotor body 402 is rotated about the first axis 106. When the upper plunger assembly 444 aligns with a respective upper detent hole 442, a rounded plunger 446 of the upper plunger assembly 444 protrudes into the respective upper detent hole 442. This holds the upper rotor body 402 in a respective clocking position about the first axis 106 until the retention force is manually overcome. An upper detent assembly 440 is not necessary, however. In an alternate example embodiment, the clocking position may be held via any suitable mechanism, including merely via friction between the upper locating plate 424 and the adapter 400 and the upper rotor body 402.

Figure 8:
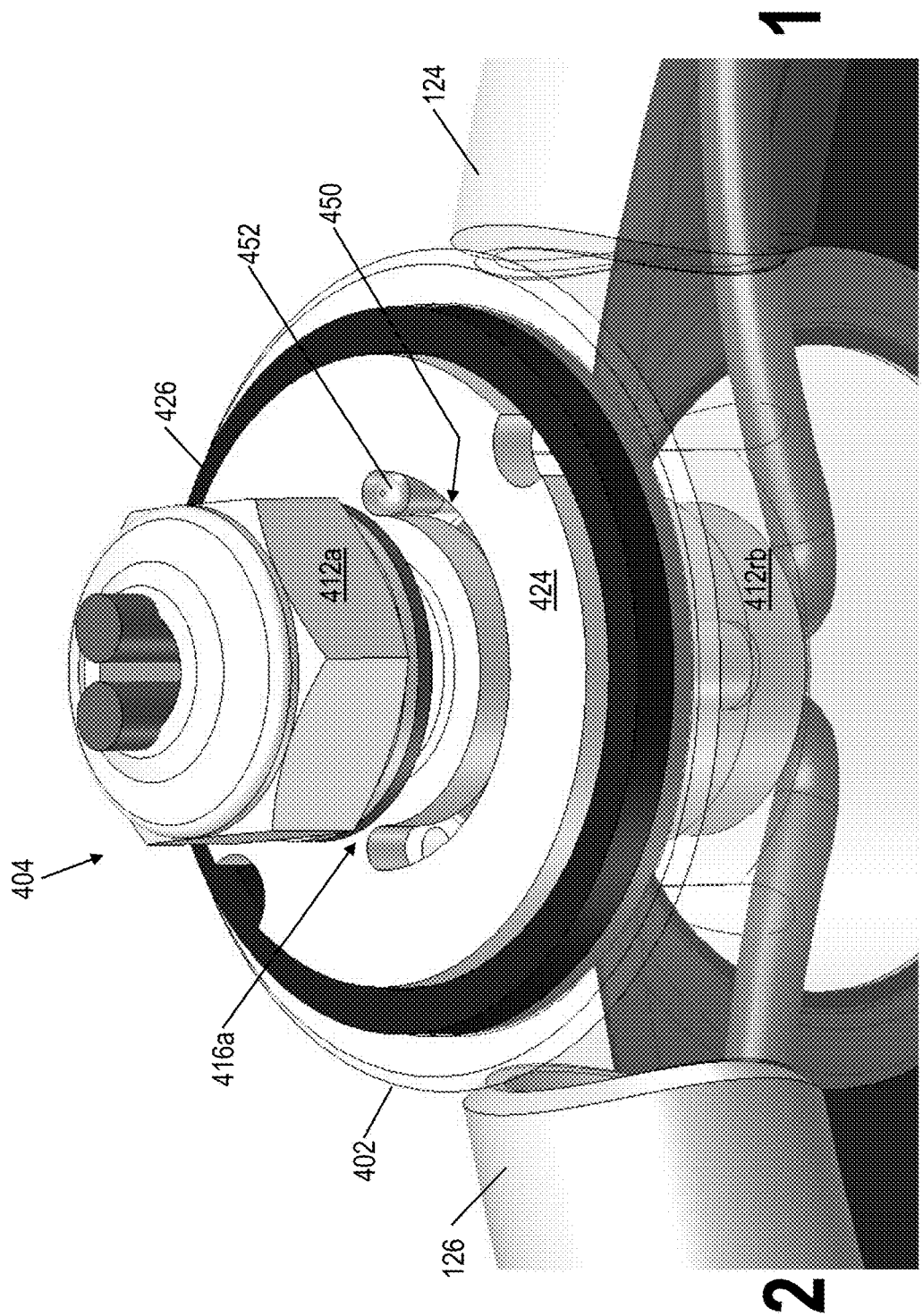

In an example embodiment, the upper joint assembly 404 further includes an upper limiting slot 450 disposed in the upper locating plate 424 and an upper limiter pin 452 secured to the upper rotor body 402 and configured to orbit the first axis 106 while in the upper limiting slot 450 as the upper rotor body 402 is rotated about the first axis 106. The upper limiting slot 450 and the upper limiter pin 452 limit an amount of rotation of the upper rotor body 402 about the first axis 106. FIG. 4 to FIG. 7 show the upper connection assembly 120 and its components from the front. In contrast, FIG. 8 is a rear view. In this example embodiment, the upper limiting slot 450 has a semicircular arcuate shape that permits the upper rotor body 402 to rotate 180 degrees about the first axis 106. However, the upper limiting slot 450 may permit more than 180 degrees or less than 180 degrees. In various alternate embodiments, the upper limiting slot 450 and the upper limiter pin 452 may not be present.

In contrast to the above, it is equally possible to have the upper locating plate 424 be secured to the upper rotor body 402, to have the plurality of upper detent holes 442 be disposed in the upper surface of the upper locating plate 424 and the upper plunger assembly 444 be disposed in the adapter 400, and to have the upper limiter pin 452 be disposed in the adapter 400. Any combination of these various embodiments is possible. In an example embodiment, the adapter 400 may be secured to the tower 102 via fasteners 460.

Figure 9:
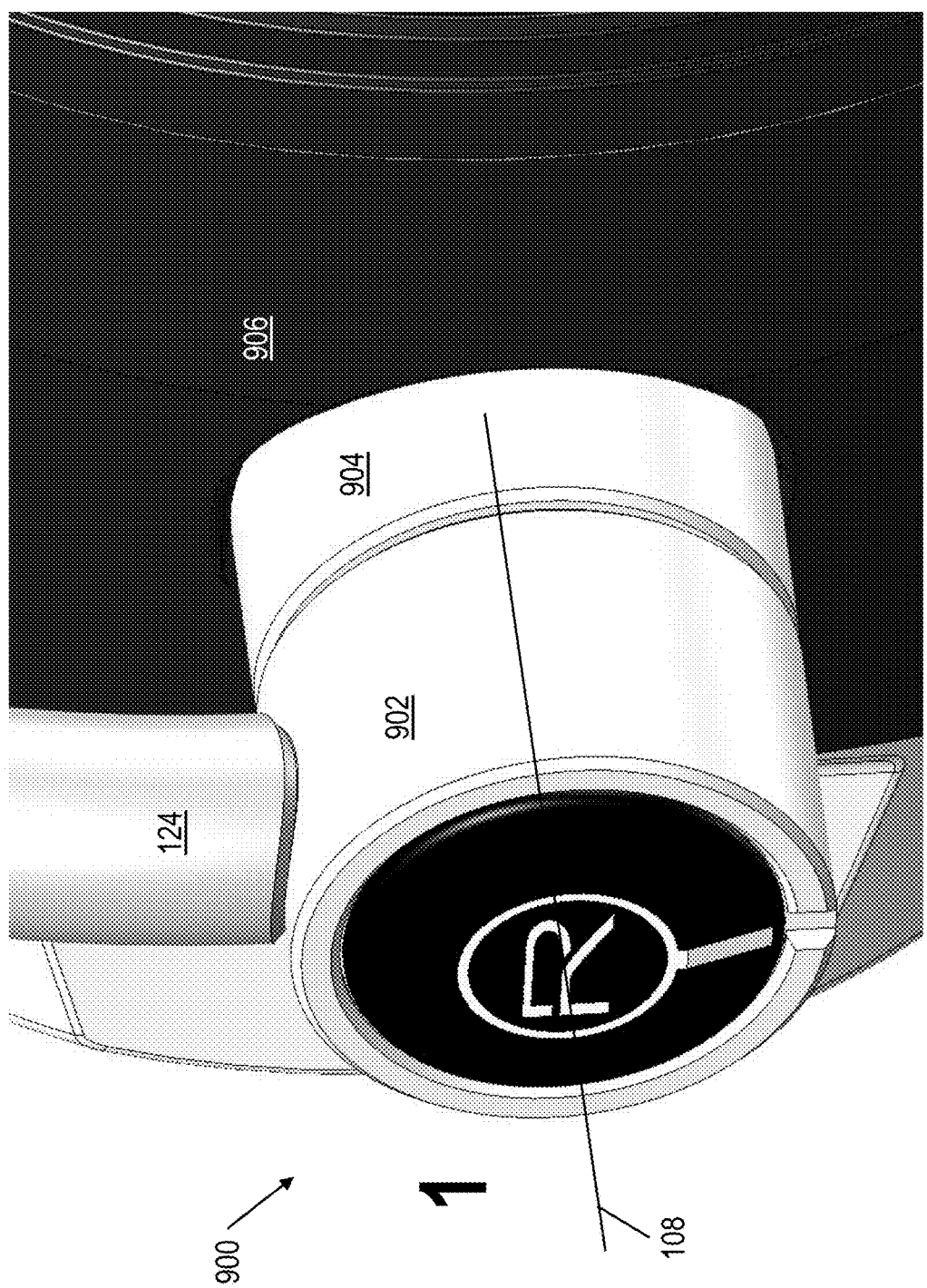
FIG. 9 to FIG. 11 show an example embodiment of a first lateral rotation assembly of the dual axis adjustable speaker mount of FIG. 1.
Figure 10:
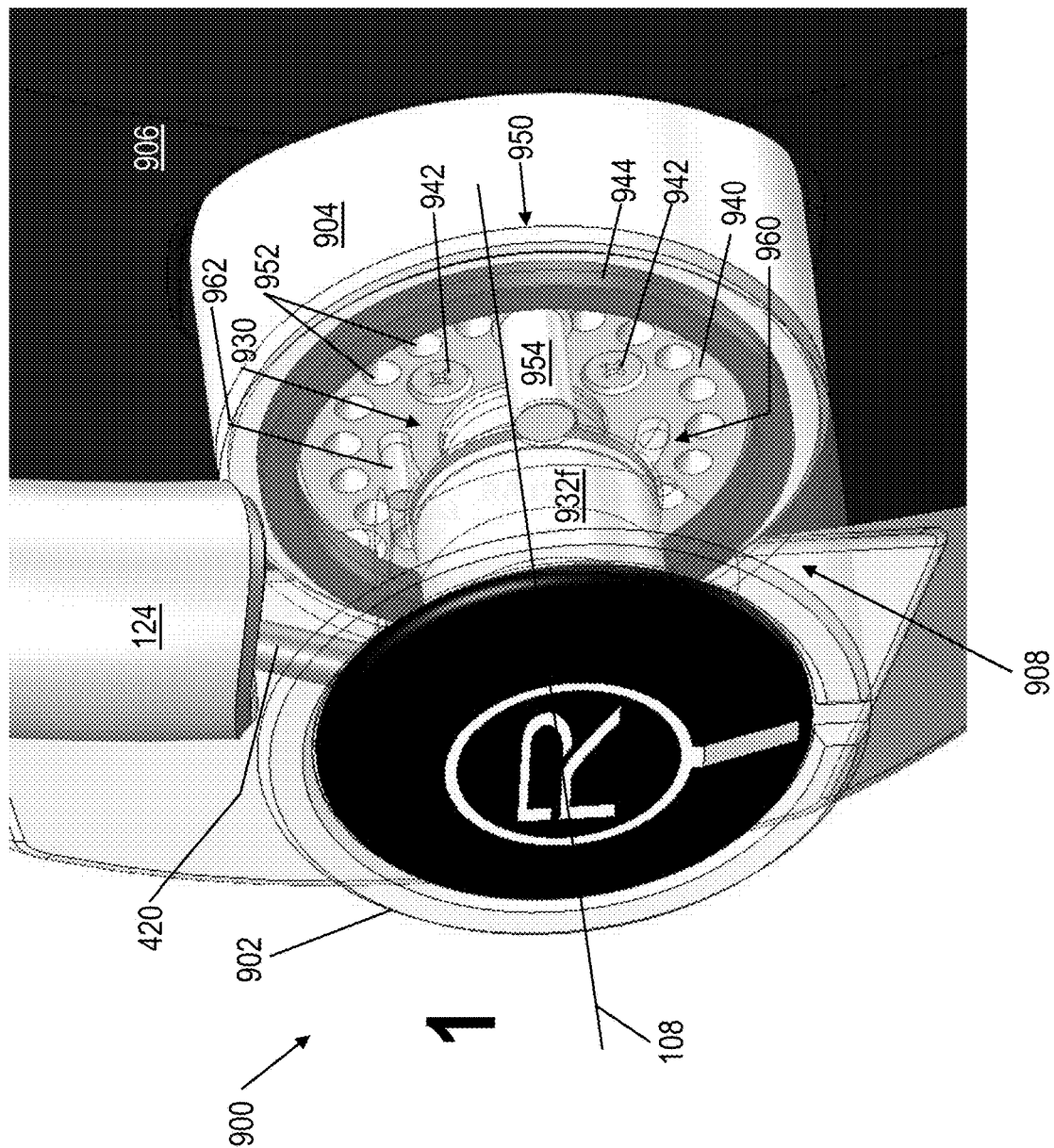
Figure 11:
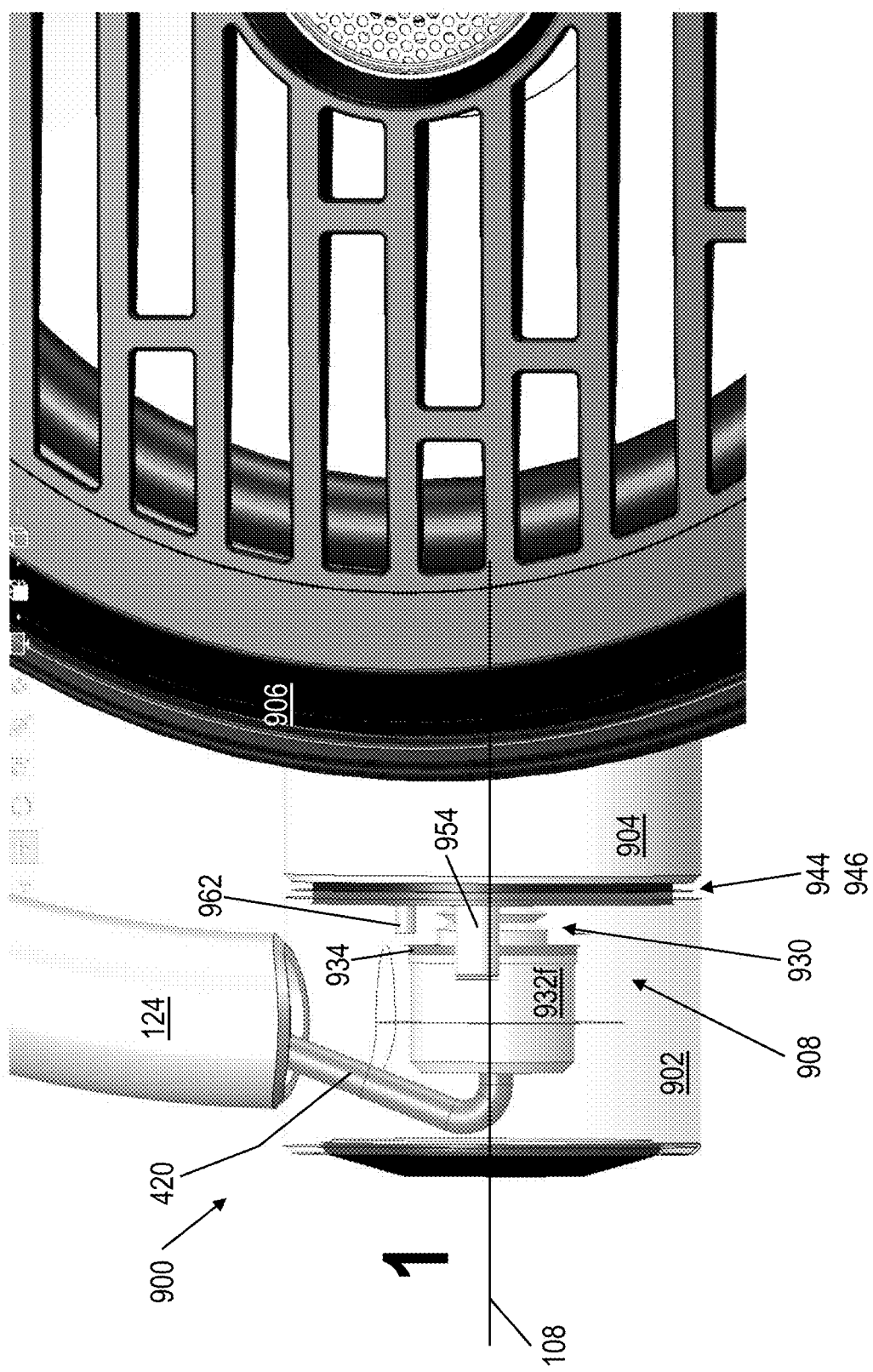

FIG. 9 to FIG. 11 show an example embodiment of a first lateral connection assembly 900 of the dual rotation speaker mount of FIG. 1.

The first lateral connection assembly 900 includes a first outer side rotation body 902, a first inner side rotation body 904 configured to be secured to the speaker housing 906, and a first joint assembly 908 therebetween that is configured to permit rotation of the first inner side rotation body 904 about the second axis 108 that is perpendicular to the first axis 106.

In this example embodiment, the first lateral connection assembly 900 is configured like the upper connection assembly 120. The first inner side rotation body 904 is secured to the speaker housing 906 like the adapter 400 is secured to the tower 102. The first outer side rotation body 902 is secured to the frame 122 (the distal end of the first lateral arm 124) like the upper rotor body 402 is secured to the frame 122. In the upper connection assembly 120, the upper rotor body 402 rotates relative to the "stationary" adapter 400. In the first lateral connection assembly 900, the first inner side rotation body 904 and associated speaker housing 906 rotate relative to the "stationary" first outer side rotation body 902. While the orientation of the upper connection assembly 120 can thereby be seen as reversed relative to the first lateral connection assembly 900 in an example embodiment, the components may otherwise be identical.

The first joint assembly 908 includes a first threaded spindle 930, a first nut (not visible), and a first cap 932f (in respective recesses) that are concentric with the second axis 108 and secure the first inner side rotation body 904 to the first outer side rotation body 902. Optional friction washers 934 are disposed between the nut and the first inner side rotation body 904 and between first cap 932f and the first outer side rotation body 902.

In an example embodiment, the first threaded spindle 930 may have a hollow, cylindrical shape that acts as a conduit to allow wires 420 to pass through the first lateral connection assembly 900 and into the speaker housing 906. In an example embodiment, at least one of the first lateral arm 124 and the second lateral arm 126 is also hollow and configured to act as a conduit through which the wires 420 pass to reach the respective lateral connection assembly.

In an example embodiment, a first locating plate 940 is secured to the first inner side rotation body 904 via first securing plate screws 942. The first locating plate 940 may be concentric with the first threaded spindle 930 and may be surrounded by a first washer 944 (e.g., rubber) concentric with the first locating plate 940 that forms an upper seal 946 between the first outer side rotation body 902 and the first inner side rotation body 904. The first locating plate 940 and optional first washer 944 center the first inner side rotation body 904 relative to the first outer side rotation body 902 and about the second axis 108.

In an example embodiment, a first detent assembly 950 includes a plurality of first detent holes 952 disposed on an outer side of the first locating plate 940 in an annular array about the second axis 108. The first detent assembly 950 further includes at least one first plunger assembly 954 disposed in the first outer side rotation body 902 and configured to selectively align with a respective first detent hole 952 as the first inner side rotation body 904 is rotated about the second axis 108. When the first plunger assembly 954 aligns with a respective first detent hole 952, a rounded plunger of the first detent assembly 950 protrudes into the respective first detent hole 952. This holds the first inner side rotation body 904 in a respective clocking position about the second axis 108 until the retention force is manually overcome. A first detent assembly 950 is not necessary, however. In an alternate example embodiment, the clocking position may be held via any suitable mechanism, including merely via friction between the first locating plate 940 and the first outer side rotation body 902 and the first inner side rotation body 904.

In an example embodiment, the first joint assembly 908 further includes a first limiting slot 960 disposed in the first locating plate 940 and a first limiter pin 962 secured to the first outer side rotation body 902 and configured to remain in the first limiting slot 960 as the first inner side rotation body 904 is rotated about the second axis 108. The first limiting slot 960 and first limiter pin 962 limit an amount of rotation of the first inner side rotation body 904 about the second axis 108. The first limiting slot 960 may permit more than 180 degrees or less than 180 degrees. In various alternate embodiments, the first limiting slot 960 and the first limiter pin 962 may not be present.

In contrast to the above, it is equally possible to have the first locating plate 940 be secured to the first outer side rotation body 902, to have the plurality of first detent holes 952 be disposed in the inner surface of the first locating plate 940 and the first plunger assembly 954 be disposed in the first inner side rotation body 904, and to have the first limiter pin 962 be disposed in the first inner side rotation body 904. Any combination of these various embodiments is possible.

Figure 12:
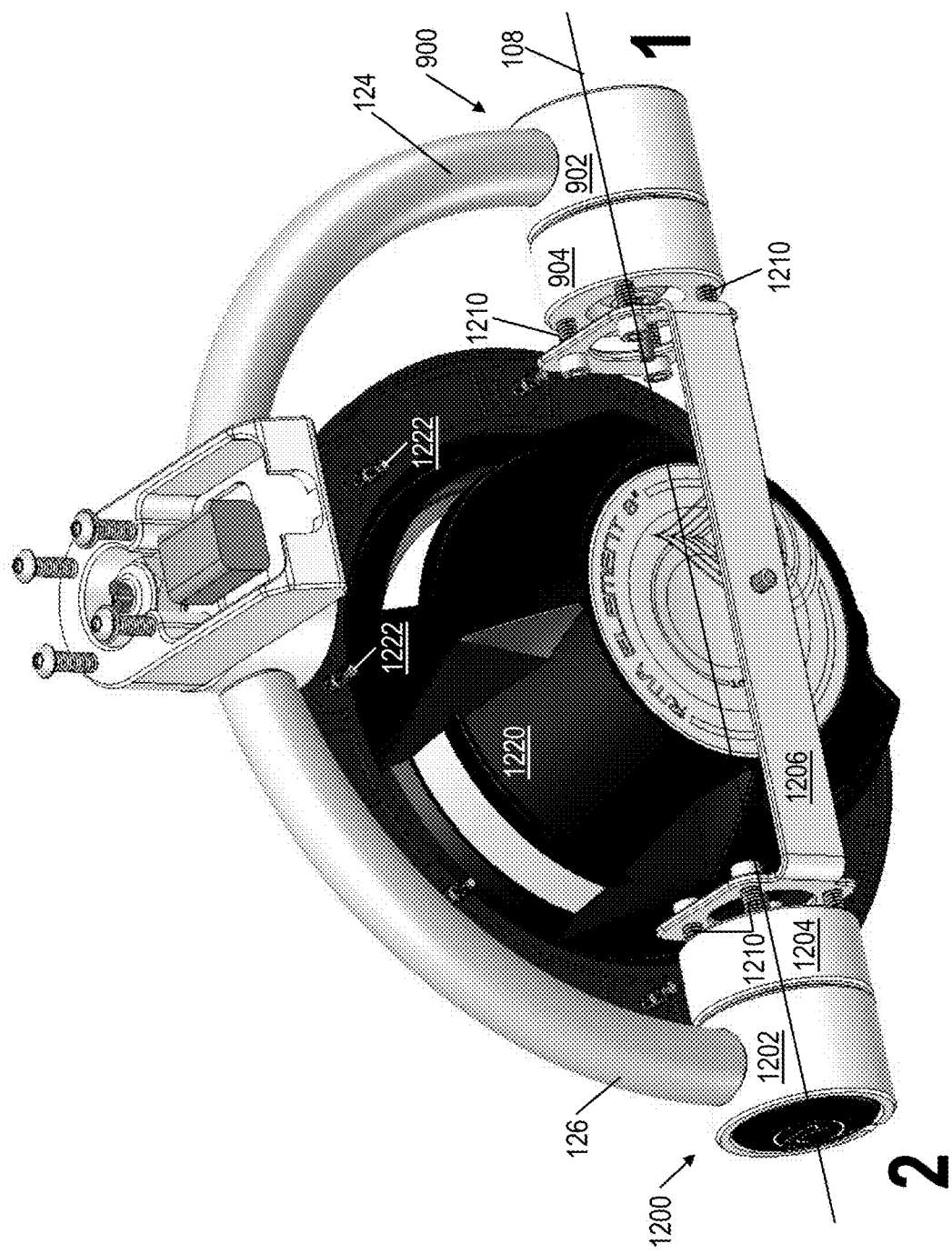
FIG. 12 shows an example embodiment of the first lateral connection assembly and the second lateral connection assembly from the rear.

FIG. 12 shows the first lateral connection assembly 900 and the second lateral connection assembly 1200 from the rear. In this example embodiment, the second lateral connection assembly 1200 includes the same components and functions the same way as the first lateral connection assembly 900. Visible are the second outer side rotation body 1202 the second inner side rotation body 1204.

In an example embodiment, the first detent assembly 950 is configured to selectively secure the speaker housing 906 in a first plurality of clocking positions about the second axis 108. A second detent assembly of the second lateral connection assembly 1200 is similarly configured to selectively secure the speaker housing 906 in a second plurality of second clocking positions about the second axis 108. In an example embodiment, the first plurality of clocking positions and the second plurality of second clocking positions are the same clocking positions. In an alternate example embodiment, the first plurality of clocking positions and the second plurality of second clocking positions are different clocking positions. In such an example embodiment, the detent holes of the first detent assembly 950 may be circumferentially offset from the detent holes of the second detent assembly. Such a configuration can double the amount of available clocking positions about the second axis 1-8.

FIG. 12 also shows a connecting bracket 1206 connected to the first inner side rotation body 904 and to the second inner side rotation body 1204 that is configured to prevent relative rotation between the first inner side rotation body 904 and the second inner side rotation body 1204 about the second axis 108. When an operator manually repositions the speaker housing 906 about the second axis 108, the connecting bracket 1206 helps distribute the forces imparted by the operator on the speaker housing 906 among the first inner side rotation body 904 and to the second inner side rotation body 1204. This, in turn, helps ensure smooth operation and longer life by reducing force and associated stress mismatches on the components. The connecting bracket 1206 may also, for example, be a mount for a light that illuminates the translucent light cover 142.

The speaker housing may be secured to the first inner side rotation body 904 and to the second inner side rotation body 1204 by, for example, lateral connection fasteners 1210. The speaker 1220 may be secured to the speaker housing 906 via, for example, speaker fasteners 1222.

Figure 13:
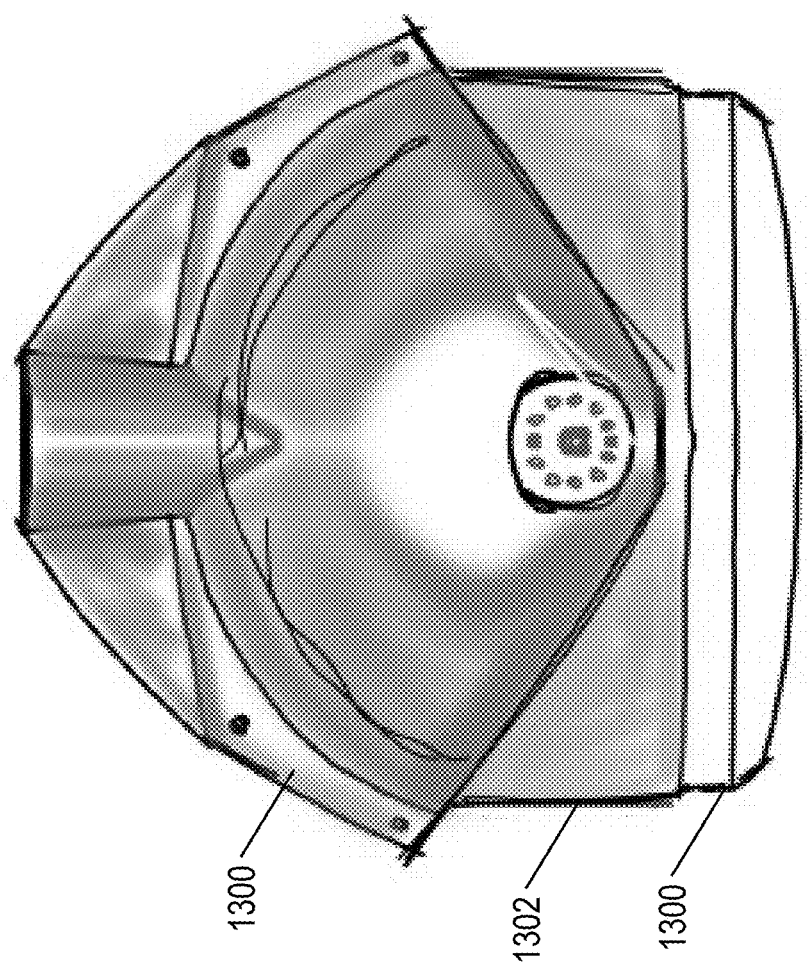
FIG. 13 shows an alternate example embodiment of the frame of the dual axis adjustable speaker mount.

FIG. 13 shows an alternate example embodiment of the frame 1300 of the dual axis adjustable speaker mount holding a speaker housing 1302 and speaker 1304. The frame 1300 has a different shape than the frame 122 of FIG. 1, but the remainder of the components may be the same.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
    an upper connection assembly comprising an adapter configured to be secured to a boat tower, an upper rotor body, and an upper joint assembly therebetween that is configured to permit rotation of the upper rotor body about a first axis;
    a first lateral connection assembly comprising a first outer side rotation body, a first inner side rotation body configured to be secured to a speaker housing, and a first lateral joint assembly therebetween that is configured to permit rotation of the first inner side rotation body about a second axis that is perpendicular to the first axis;
    a frame that secures the first lateral connection assembly to the upper connection assembly and that is configured to orbit the first lateral connection assembly around the first axis when the upper rotor body is rotated about the first axis;
    wherein the upper joint assembly further comprises an upper detent assembly configured to selectively secure the upper rotor body in a respective upper clocking position of a plurality of upper clocking positions about the first axis; and
    wherein the upper joint assembly further comprises an upper locating plate that is disposed between the adapter and the upper rotor body and that aligns the upper rotor body with the adapter.

2. The apparatus of claim 1, wherein the upper detent assembly comprises a plurality of upper detent holes disposed in the upper locating plate and an upper plunger assembly configured to selectively align with a respective upper detent hole of the plurality of upper detent holes as the upper rotor body is rotated about the first axis.

3. The apparatus of claim 2, wherein the upper locating plate is secured to the adapter, and wherein the upper plunger assembly is secured to the upper rotor body.

4. The apparatus of claim 1, wherein the upper joint assembly further comprises an upper spindle that is concentric with the first axis and that secures the adapter to the upper rotor body.

5. The apparatus of claim 1, wherein the upper joint assembly further comprises an upper limiting slot disposed in the upper locating plate and an upper limiter pin configured to orbit the first axis while in the upper limiting slot as the upper rotor body is rotated about the first axis, wherein the upper limiting slot and the upper limiter pin limit an amount of rotation of the upper rotor body about the first axis.

6. The apparatus of claim 5, wherein the upper limiting slot limits the amount of rotation to 180 degrees.

7. The apparatus of claim 1, wherein the upper joint assembly further comprises an upper spindle that secures the adapter to the upper rotor body and that comprises a hollow cylinder shape configured to provide a conduit for wires through the upper joint assembly.

8. The apparatus of claim 1, wherein the upper joint assembly further comprises an upper washer that forms an upper seal between the upper rotor body and the adapter.

9. The apparatus of claim 1, wherein the first lateral joint assembly further comprises a first detent assembly configured to selectively secure the first inner side rotation body in a respective second clocking position of a plurality of second clocking positions about the second axis.

10. The apparatus of claim 9, wherein the first lateral joint assembly further comprises:
a first locating plate that is disposed between the first outer side rotation body and the first inner side rotation body;
a first limiting slot disposed in the first locating plate; and
a first limiter pin configured to orbit the second axis while in the first limiting slot as the first inner side rotation body is rotated about the second axis, wherein the first limiting slot and the first limiter pin limit an amount of rotation of the first inner side rotation body about the second axis.

11. The apparatus of claim 10, wherein when the first axis is vertical and the second axis is horizontal, the first limiter slot limits the amount of rotation of the first inner side rotation body to 180 degrees about the second axis, including a three o'clock position, a six o'clock position, and a nine o'clock position.

12. The apparatus of claim 9, further comprising a second lateral connection assembly further comprising a second outer side rotation body, a second inner side rotation body configured to be secured to the speaker housing, and a second joint assembly therebetween that is configured to permit rotation of the second inner side rotation body about the second axis;
wherein the frame is configured to orbit the second lateral connection assembly around the first axis when the upper rotor body is rotated about the first axis.

13. The apparatus of claim 12, further comprising a connecting bracket that is connected to the first inner side rotation body and to the second inner side rotation body and that is configured to prevent relative rotation therebetween about the second axis.

14. The apparatus of claim 1, further comprising the speaker housing.

15. The apparatus of claim 14, further comprising a speaker secured to the speaker housing.

16. An apparatus, comprising:
an upper connection assembly comprising an adapter configured to be secured to a boat tower, an upper rotor body, and an upper joint assembly therebetween that is configured to permit rotation of the upper rotor body about a first axis;
a frame secured to the upper rotor body and comprising a first lateral arm and a second lateral arm;
a first lateral connection assembly secured to the first lateral arm and configured to be secured to a speaker housing;
a second lateral connection assembly secured to the second lateral arm and configured to be secured to the speaker housing;
wherein the first lateral connection assembly and the second lateral connection assembly are configured to permit rotation of the speaker housing about a second axis that is perpendicular to the first axis;
wherein the first lateral connection assembly comprises a first lateral detent assembly configured to selectively secure the speaker housing in a respective second clocking position of a first plurality of second clocking positions about the second axis;
wherein the second lateral connection assembly comprises a second lateral detent assembly configured to selectively secure the speaker housing in a respective second clocking position of a second plurality of second clocking positions about the second axis; and
wherein second clocking position of the first plurality of second clocking positions are circumferentially offset from second clocking positions of the second plurality of second clocking positions.

17. The apparatus of claim 16, wherein the upper joint assembly further comprises an upper detent assembly configured to selectively secure the upper rotor body in a respective upper clocking position of a plurality of upper clocking positions about the first axis.

18. The apparatus of claim 17, wherein the upper joint assembly further comprises an upper washer that forms an upper seal between the upper rotor body and the adapter.

19. The apparatus of claim 16, wherein at least one of the first lateral connection assembly and the second lateral connection assembly comprises a lateral detent assembly configured to selectively secure the speaker housing in a respective second clocking position of a plurality of second clocking positions about the second axis.

20. The apparatus of claim 16,
wherein the first lateral connection assembly comprises a first inner side rotation body configured to be secured to the speaker housing;
wherein the second lateral connection assembly comprises a second inner side rotation body configured to be secured to the speaker housing; and
wherein the apparatus further comprises a connecting bracket connected to the first inner side rotation body and to the second inner side rotation body that is configured to prevent relative rotation therebetween about the second axis.

21. The apparatus of claim 16, wherein the frame comprises a u-shape, and wherein the upper rotor body is secured to an apex of the u-shape.

22. The apparatus of claim 16, further comprising the speaker housing.

23. An apparatus, comprising:
an upper connection assembly comprising an adapter configured to be secured to a boat tower, an upper rotor body, and an upper joint assembly therebetween that is configured to permit rotation of the upper rotor body about a first axis;

a first lateral connection assembly comprising a first outer side rotation body, a first inner side rotation body configured to be secured to a speaker housing, and a first lateral joint assembly therebetween that is configured to permit rotation of the first inner side rotation body about a second axis that is perpendicular to the first axis;

a frame that secures the first lateral connection assembly to the upper connection assembly and that is configured to orbit the first lateral connection assembly around the first axis when the upper rotor body is rotated about the first axis; and wherein the upper joint assembly further comprises an upper spindle that secures the adapter to the upper rotor body and that comprises a hollow cylinder shape configured to provide a conduit for wires through the upper joint assembly.

* * * * *